US 6,585,317 B1

(12) United States Patent
Atherley

(10) Patent No.: US 6,585,317 B1
(45) Date of Patent: *Jul. 1, 2003

(54) LIGHT-WEIGHT SNOWMOBILE SEAT

(76) Inventor: James Atherley, 113 E. Teal Rd., Saratoga Springs, UT (US) 84043

( * ) Notice: Subject to any disclaimer, the term of this patent is extended or adjusted under 35 U.S.C. 154(b) by 0 days.

This patent is subject to a terminal disclaimer.

(21) Appl. No.: 10/145,593

(22) Filed: May 13, 2002

Related U.S. Application Data

(63) Continuation-in-part of application No. 09/611,396, filed on Jul. 7, 2000, now Pat. No. 6,386,630, which is a continuation-in-part of application No. 09/358,179, filed on Jul. 20, 1999, now Pat. No. 6,086,149, which is a continuation-in-part of application No. 08/948,691, filed on Oct. 10, 1997, now Pat. No. 5,944,380.

(51) Int. Cl.[7] ................................ B60N 2/40; B62J 1/22
(52) U.S. Cl. .................. 297/195.11; 297/195.1; 297/195.13; 297/214; 297/219.11; 297/452.48; 297/452.61; 297/DIG. 1; 297/DIG. 6; 297/188.01; 297/188.08; 180/219
(58) Field of Search .................. 297/195.1, 195.11, 297/195.13, 214, 219.11, 452.28, 452.61, DIG. 1, DIG. 6, 188.08, 188.13, 188.19, 188.01; 180/219

(56) References Cited

U.S. PATENT DOCUMENTS

| 3,388,946 A | 6/1968 | Grace ..................... 297/195 X |
| 3,588,171 A | 6/1971 | Rich, Jr. ................. 297/214 X |
| 3,627,073 A | 12/1971 | Grimm .............. 297/215.11 X |
| 3,741,596 A | 6/1973 | Cate ...................... 297/215.11 |
| 3,927,727 A | 12/1975 | Hanagan .............. 297/195.1 X |
| 4,095,820 A | 6/1978 | Hanagan ............ 297/215.11 X |
| 4,125,285 A | 11/1978 | Hanagan ............ 297/215.11 X |
| 4,451,083 A | 5/1984 | Marchello ............... 297/214 X |
| 4,688,509 A | 8/1987 | Nishida ............... 297/195.1 X |
| 4,691,963 A | 9/1987 | Mikuniya et al. ... 297/452.48 X |
| 4,779,695 A | 10/1988 | Yasui |
| 4,779,924 A | 10/1988 | Rudel ................. 297/195.13 X |
| 4,925,513 A | 5/1990 | Witzke et al. ....... 297/452.61 X |
| 5,040,632 A | 8/1991 | Fujii et al. ........... 297/195.1 X |
| 5,088,747 A | 2/1992 | Morrision et al. . 297/DIG. 6 X |
| 5,165,754 A | 11/1992 | Louys ......................... 297/391 |
| 5,176,860 A | 1/1993 | Storch ....................... 264/46.6 |
| 5,190,350 A | 3/1993 | Hwang et al. ..... 297/DIG. 1 X |
| 5,353,734 A | 10/1994 | Tani ..................... 297/199 X |
| 5,533,783 A | 7/1996 | Harms et al. .......... 297/195.13 |
| 5,542,747 A | 8/1996 | Burchi .............. 297/DIG. 1 X |

(List continued on next page.)

FOREIGN PATENT DOCUMENTS

| JP | 2011482 | 1/1990 | |
| JP | 4-331676 A | 11/1992 | ............ 297/195.13 |
| SU | 1507-637 A | 9/1989 | ................. 297/214 |

*Primary Examiner*—Rodney B. White
(74) *Attorney, Agent, or Firm*—Thorpe North & Western

(57) ABSTRACT

A snowmobile seat a flexible seat section disposed over a substantially rigid base that is disposed over an upper surface of a track tunnel of a snowmobile. The rigid base is formed of a closed cell foam with cell walls and cell voids such that the base section is substantially rigid and light weight, while the flexible seat section is formed of an open cell foam. A cover covers at least the flexible seat section to resist absorption of water by the open cell foam of the flexible seat section. A storage cavity can be formed in the rigid base section to receive items for storage. The closed cell foam is formed around at least a portion of the storage cavity to thermally insulate the storage cavity. A flap can be coupled to the cover and removably positioned over an opening into the storage cavity. Zippers can be formed on opposite sides of the flap to releasably secured to the cover to selectively maintain the flap over the opening into the storage cavity.

18 Claims, 7 Drawing Sheets

U.S. PATENT DOCUMENTS

| | | | |
|---|---|---|---|
| 5,639,145 A | 6/1997 | Alderman | 297/452.45 |
| 5,675,853 A | 10/1997 | Linge | 5/655 |
| 5,713,630 A | 2/1998 | Kvalvik | 297/254 |
| 5,720,518 A | 2/1998 | Harrison | 297/214 |
| 5,722,729 A | 3/1998 | Carilli | 297/DIG. 1 X |
| 5,735,229 A | 4/1998 | House et al. | 297/217.1 X |
| 5,762,842 A | 6/1998 | Burchi et al. | 264/46.4 |
| 5,802,642 A | 9/1998 | Slaughter | 5/656 |
| 5,944,380 A * | 8/1999 | Atherley | 297/195.1 |
| 6,086,149 A * | 7/2000 | Atherley | 297/195.1 |
| 6,345,865 B1 * | 2/2002 | Ashida et al. | 297/195.1 |
| 6,371,233 B2 * | 4/2002 | Ishii | 297/195.1 X |
| 6,386,630 B1 * | 5/2002 | Atherly | 297/195.1 X |

* cited by examiner

LIGHT-WEIGHT SNOWMOBILE SEAT

This application is a continuation-in-part U.S. patent application Ser. No. 09/611,396, filed Jul. 7, 2000, now U.S. Pat. No. 6,386,630, which is a continuation-in-part of Ser. No. 09/358,179 now U.S. Pat. No. 6,086,149, filed Jul. 20, 1999, which is a continuation-in-part of Ser. No. 08948691 U.S. Pat. No. 5,944,380, filed Oct. 10, 1997.

BACKGROUND OF THE INVENTION

1. Field of the Invention

The present invention relates generally to snowmobile seats. More particularly, the present invention relates to a light-weight snowmobile seat.

2. Related Art

Most snowmobiles require a cushioned seat for the rider to sit on for comfort, as well as safety. For many of these snowmobiles, weight is also an issue, and any reduction in weight is significant. For example, additional weight on a snowmobile adds to the problem of the track sinking into the snow and stalling the snowmobile. The added weight also reduces fuel efficiency and reduces speed, an issue for racing snowmobiles.

Traditional seats have a rigid base of metal or plastic. The base is covered in a softer padding. The padding and base are covered with a covering to keep the padding fixed to the base and to keep the padding from coming apart. These seats are typically formed as a unitary part that is bolted to the snowmobile frame.

One problem with the traditional seats is the significant weight. The metal or plastic base is particularly heavy. The typical snowmobile base weighs approximately six pounds, while the entire seat weighs approximately 15 to 18 pounds.

Another problem with the traditional seats is that they absorb moisture. While the covers are sometimes water-resistant, moisture still seeps in through the seams. The covers are also easily ripped, also allowing moisture to enter. The cushions are typically made with an opencell foam that absorbs water. The cushion tends to act like a giant sponge, soaking up water and increasing the weight of the seat. Absorbed moisture also effects the performance of the cushion. Moisture not only causes the foam to deteriorate, but a cold and wet seat is uncomfortable and may later freeze, making the seat dangerously hard.

Another problem with the traditional seats is that the cover is formed permanently with the base and cushion. Thus, the cover cannot be removed for cleaning. Another problem is that the typical covers are designed to prevent moisture from entering the seat, so they also tend to prevent the seat from drying once the seat has absorbed moisture, thus causing the seat to rot. A further problem with the traditional seats is that they bolt or otherwise attach to the frame of the snowmobile. Many snowmobiles locate critical parts, such as batteries, engines, and fuel tanks, under the seat. The bolts make the seat difficult and time consuming to remove, as well as adding weight. In addition, tools must be carried, adding weight.

SUMMARY OF THE INVENTION

The invention provides a snowmobile seat capable of providing a seat between the rider and a track tunnel of the snowmobile that reduces weight; thermally, chemically and physically isolates the rider from the track tunnel, a fuel tank, and the engine of the snowmobile; resists moisture absorption; and/or provides a thermally insolated storage cavity for tools or beverages. The seat can include a substantially rigid base disposed over an upper surface of a track tunnel of a snowmobile. The base section advantageously is formed of a closed cell foam with cell walls and cell voids such that the base section is substantially rigid and light weight. In addition, the closed cell foam of the base section can provide a rigid shape and structural support for the seat. A flexible seat section can be disposed over at least a portion of the rigid base to provide a cushioned seat for a rider. The seat section can be formed of an open cell foam. A cover covers at least the flexible seat section and can include a water resistant material to resist absorption of water by the open cell foam of the flexible seat section.

In accordance with a more detailed aspect of the present invention, the base section or a bottom surface thereof can abut directly to the upper surface of the track tunnel of the snowmobile. An indentation can be formed in the bottom of the rigid base section to create a space between the rigid base section and the upper surface of the track tunnel of the snowmobile. The space can accommodate various snowmobile components, such as cooling lines, electrical lines, etc., while the closed cell foam of the base section provides a rigid structure that prevents the seat from collapsing onto the snowmobile components. Similarly, an indentation can be formed in a forward end of the base section to match other snowmobile components, such as a fuel tank, etc. In addition to providing a rigid structure, the closed cell foam can provide a leak barrier between the snowmobile components, such as the fuel tank, and the flexible seat section and the cover. Thus, the open cell foam of the flexible seat section and the cover can be protected from absorbing fuel, coolant, etc.

In accordance with another more detailed aspect of the present invention, a storage cavity can be formed in the seat or the rigid base section to receive items for storage. Such items can include tools, emergency supplies, hot and cold beverages, etc. The base section or closed cell foam thereof can provide the cavity or cavity walls with a closed cell foam around at least a portion of the storage cavity to thermally insulate the storage cavity. Thus, items in the storage cavity can be thermally insulated to resist tools or cold beverages from freezing, hot beverages from cooling, etc.

In accordance with another more detailed aspect of the present invention, a flap can be coupled to the cover and removably positioned over an opening into the storage cavity. The flap can have opposite sides that are releasably secured to the cover to selectively maintain the flap over the opening into the storage cavity. Zippers, or a pair of zippers, can be formed between the opposite sides of the flap and the cover. Thus, the flap can be opened wide for access to the storage compartment without the flap inadvertently closing, and can be selectively and positively secured over the opening.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 9b is a top view of an alternative embodiment of the snowmobile seat of the present invention.

FIG. 10 is a cross sectional side view of an alternative embodiment of the snowmobile seat of the present invention, taken along line 10—10 of FIG. 9a.

FIG. 11 is a cross sectional end view of an alternative embodiment of the snowmobile seat of the present invention, taken along line 11—11 of FIG. 9a.

FIG. 12 is a cross sectional end view of an alternative embodiment of the snowmobile seat of the present invention, taken along line 11—11 of FIG. 9a.

DETAILED DESCRIPTION

Figure 1:
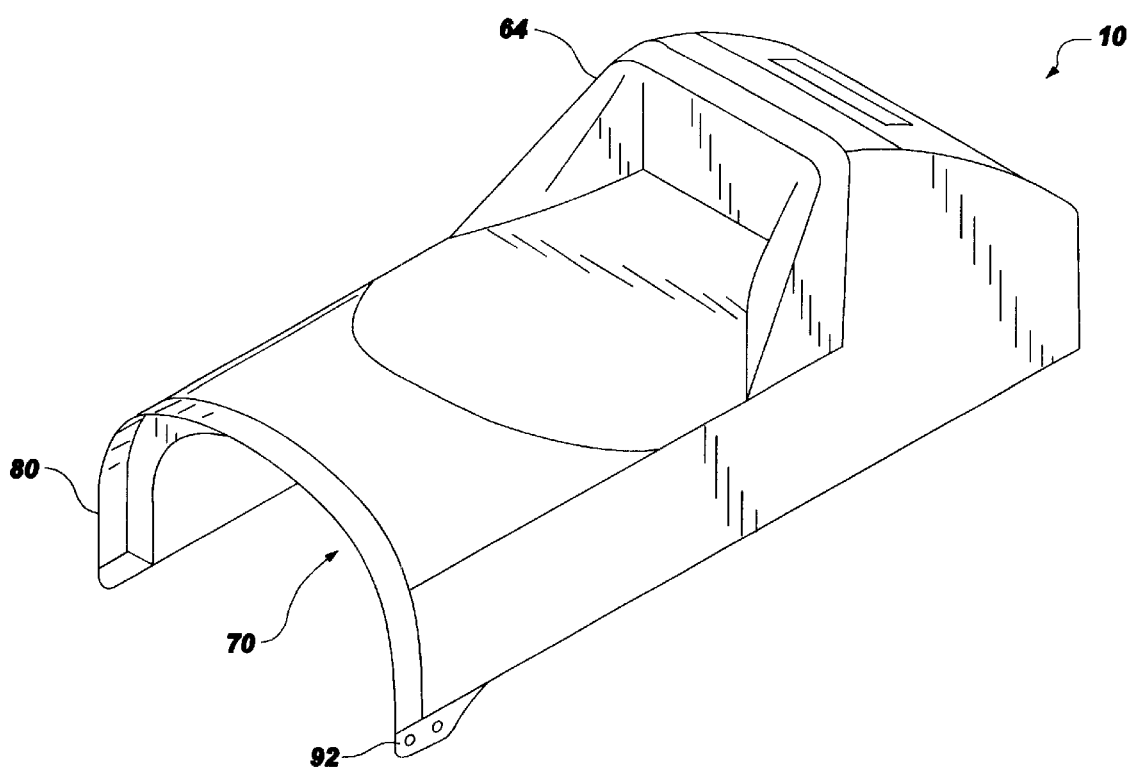
FIG. 1 is a perspective view of a preferred embodiment of the snowmobile seat of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1–6, a snowmobile seat 10 in accordance with the present invention is shown for use with a snowmobile 14. The snowmobile 14 can include a track tunnel 16 in which a track of the snowmobile rotates moves to propel the snowmobile, and moves during use. The track tunnel 16 can include a channel that opens downwardly, and can have an upper surface 17 over which a rider sits during riding. The track and track tunnel 16 extend rearwardly from an engine. A fuel tank 18 can be disposed around the track tunnel, and in between the engine and the rider.

Figure 2:
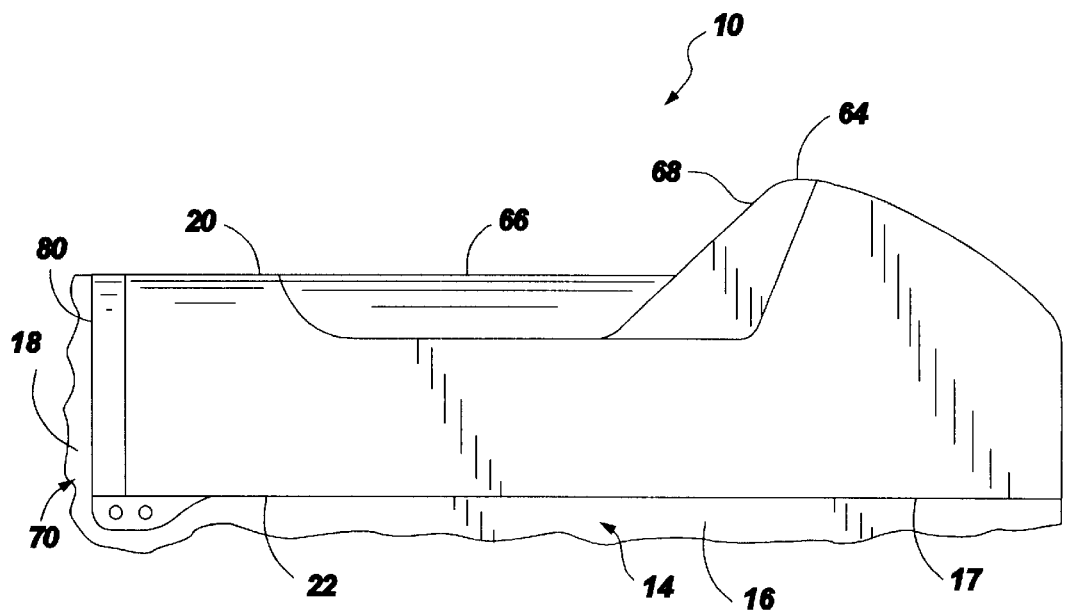
FIG. 2 is a side elevational view of a preferred embodiment of the snowmobile seat of the present invention.
Figure 3:
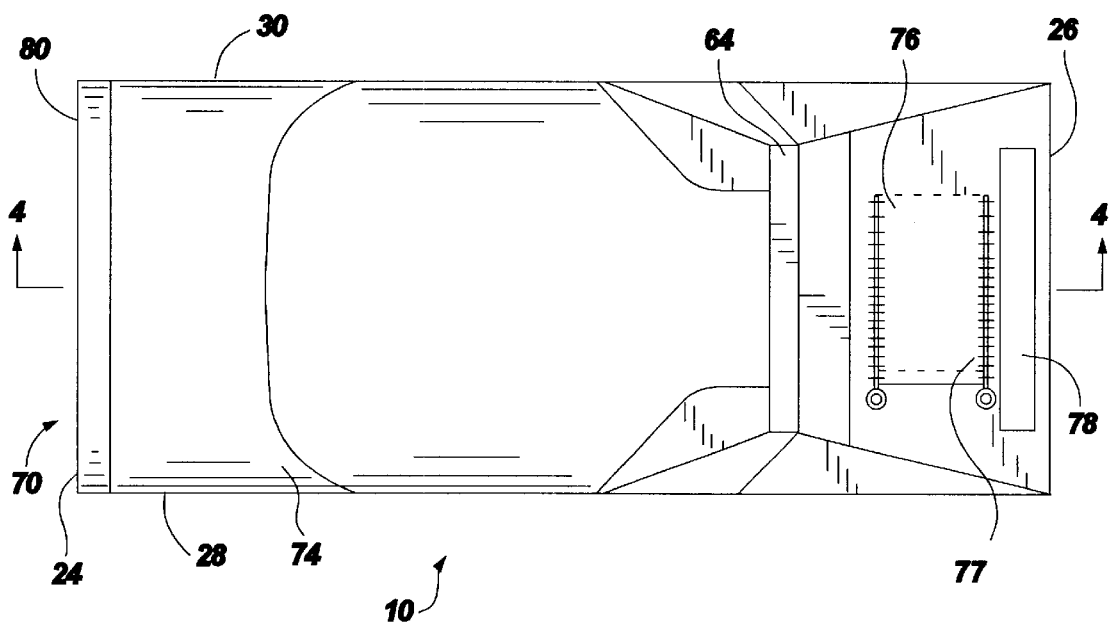
FIG. 3 is a top view of a preferred embodiment of the snowmobile seat of the present invention.

Referring to FIG. 2, the snowmobile seat 10 can have a thickness to act as a cushion between the rider and the track tunnel 16, an upper surface 20 upon which the rider can sit during riding, and a bottom 22 that can be disposed on the snowmobile 14 or that can abut the upper surface 17 of the track tunnel 16. Referring to FIG. 3, the seat 10 can be elongated and can extend along a length of the track tunnel 16, with a front 24 that can abut to the fuel tank 18, and a back 26 near a rear of the track tunnel 16. The seat 10 also can have a left side 28 (or first lateral side) and a right side 30 (or a second lateral side) that are flush with sides of the track tunnel 16. Thus, the front 24 and the bottom 22 can abut to the snowmobile 14 (or fuel tank 17 and track tunnel 16, respectively), while the sides 28 and 30 can be flush with the track tunnel 16. The front 24, back 26, and left and right sides 28 and 30 preferably mate with the snowmobile 14 in an aesthetically pleasing manner, thus blending with the design and lines of the snowmobile 14.

Figure 4:
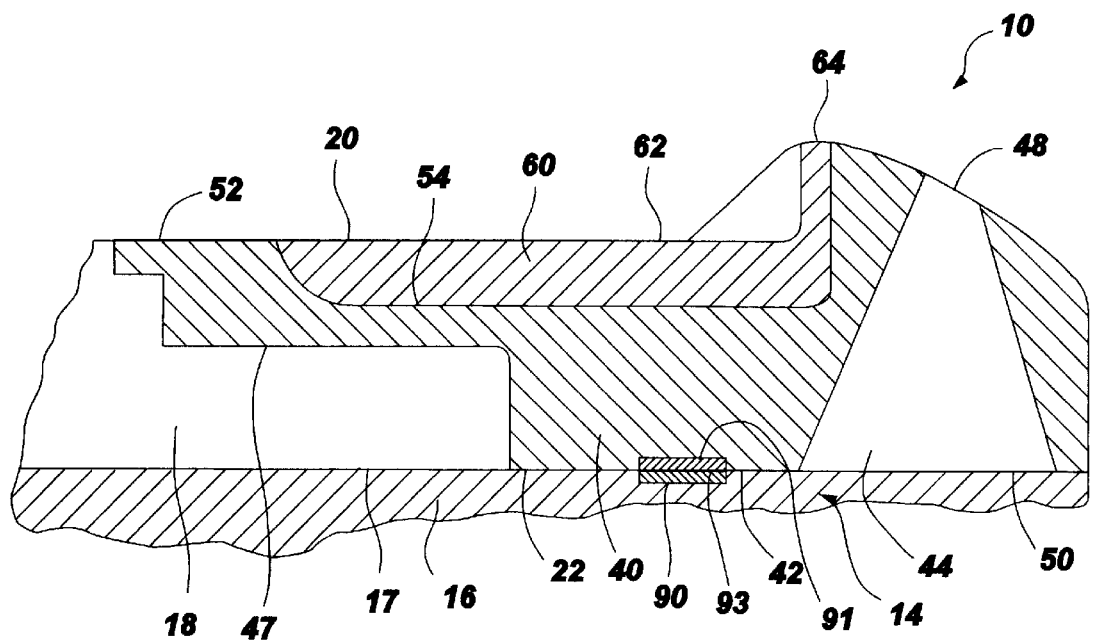
FIG. 4 is a cross section view of a preferred embodiment of the snowmobile seat of the present invention taken along line 4—4 of FIG. 3.
Figure 5:
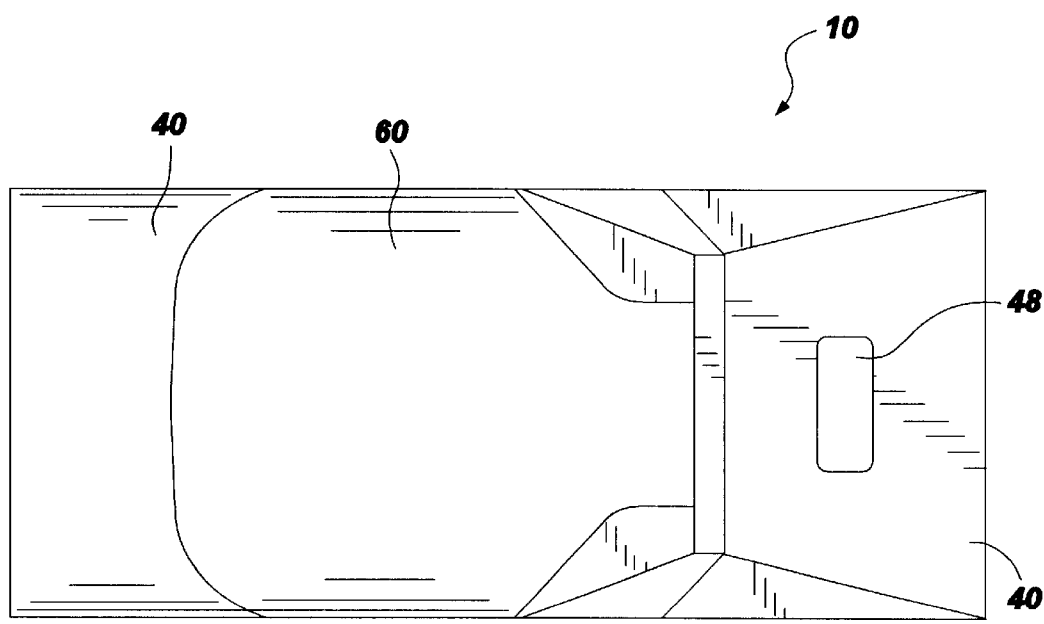
FIG. 5 is a top view of a preferred embodiment of a snowmobile seat of the present invention with the cover removed.

As illustrated in FIG. 4, the snowmobile seat 10 can include a base section 40 that can be substantially rigid to provide support for the seat 10, and to partially fill the space between the rider and the track tunnel 16 so that the rider sits at a higher elevation than the track tunnel as is considered more desirable by many riders. The base section 40 can be mounted directly on the upper surface 17 of the track tunnel 16 such that other support structure is unnecessary and to further reduce weight. The rigid base section 40 or closed cell foam can provide sufficient structure such that the other support structure is unnecessary. Alternatively, the base structure can be mounted to other support structure that in turn can be mounted on the track tunnel 16.

The base section 40 advantageously has a closed-cell structure that is substantially lightweight, and substantially rigid. The base section 40 can be formed of a closed-cell foam that can have cell walls and cell voids. The cell walls can provide strength and rigidity, while the cell voids can reduce weight. The base section 40 resists absorption of moisture and water because of the closed cells. In addition, the closed-cell structure of the rigid base section can provide a desired shape and structure of the seat. The rigid base section 40 can have a forward end shaped to match a fuel tank 18 of the snowmobile 14. The closed cell foam can provide a leak barrier between the fuel tank 18 and the rest of the seat.

The snowmobile seat 10 as shown has a total weight of approximately 4 to 6 pounds. Prior art snowmobile seats weigh approximately 15 to 18 pounds. In addition, the snowmobile seat as shown absorbs approximately 90% less water. The closed-cell base section 40 is a significant improvement over prior art seats because the closed-cell structure forms a substantially rigid base without adding weight or absorbing water.

The closed-cell structure also acts as a temperature insulator, protecting the rider from heat generated by the snowmobile and/or cold weather. The closed-cell structure also helps muffle engine noise or track noise produced by the snowmobile.

The base section 40 has a lower surface 42 that can form at least part of the bottom 22 of the seat 10. A utility or storage cavity 44 may be formed at least partially in the base section 40 to hold various items, such as gloves, tools, water bottles, a first aid kit, etc. The utility cavity 44 may be a general cube or pyramid shape or may be configured for the specific item to be carried. The closed-cell structure forming the cavity can provide insulation to thermally insulate the cavity and items contained therein. For example, the closed-cell structure can help keep coffee hot on snowmobile treks, resist water bottles from freezing, etc. An access opening 48 can be formed in the seat 10 or base section 40 to provide access to the utility cavity 44. The cavity 44, or bottom of the cavity 44, can be left open to the snowmobile 14 or tunnel 16, as shown at 50, so that heat generated by the snowmobile may be used to maintain the temperature of items contained in the cavity, such as coffee or tools. (Some snowmobiles can have a heat transfer element or radiator disposed in the track tunnel, and coupled to the engine, to assist in engine cooling.) Additional cavities or indentations 46 can be formed in the base section 40 so that the seat 10 fits around various snowmobile components, such as a gas tank, an engine, cooling lines, etc. The forward end and bottom of the base section 40 can include a cavity 47 configured to fit around a portion of the fuel tank 18 of the snowmobile. The rigid, closed-cell foam of the rigid base section 40 can provide structural rigidity to the seat 10 so that the seat section 40 resists collapsing into the cavities or indentations.

The base section 40 also can have an upper surface 52 that can be configured to form a saddle or an indentation 54 to receive a cushioned seat, as discussed in more detail below. Alternatively, the base section 40 can form the saddle or indentation along with the track tunnel and fuel tank. The upper surface 52 of the base section 40 may also form part of the upper surface 20 of the seat 10.

As stated above, a seat section 60 can be disposed in the saddle or indentation 54 formed in the base section 40. The seat section 60 has an upper surface 62 on which a rider may sit. The seat section 60 can be more flexible and can provide a cushioned seat for the rider. The seat section 60 can be formed of an open-cell foam.

Alternatively, the base section 40 may have an upper surface 52 without an indentation and upon which the seat section 60 is disposed. The seat section 60 may cover the entire upper surface 52 of the base section 40, thus providing an elongated, cushioned seat for multiple riders.

Although the base section 40 has a closed-cell structure that is substantially rigid, it also has some flexibility that provides some cushioning effect. Therefore, the flexible seat section 60 need not be as thick as required for the prior art metal or plastic base frames.

Referring to FIG. 2, the base section 40 and seat section 60 may be configured to form a back support 64. The seat section 60 may have a central portion 66 and a back support portion 68 formed rearwardly of the central portion.

Referring again to FIGS. 1–3, a cover 70 can extend over at least a portion of the base section 40 and/or seat section 60. The cover 70 may be formed of any suitable material or combination of materials. In addition, the cover is preferably strong enough to resist tears or punctures and is also preferably waterproof or water resistant to prevent moisture from seeping into the seat section. The cover can include canvas to cover most of the base section, and vinyl to cover the seat section.

Figure 6:
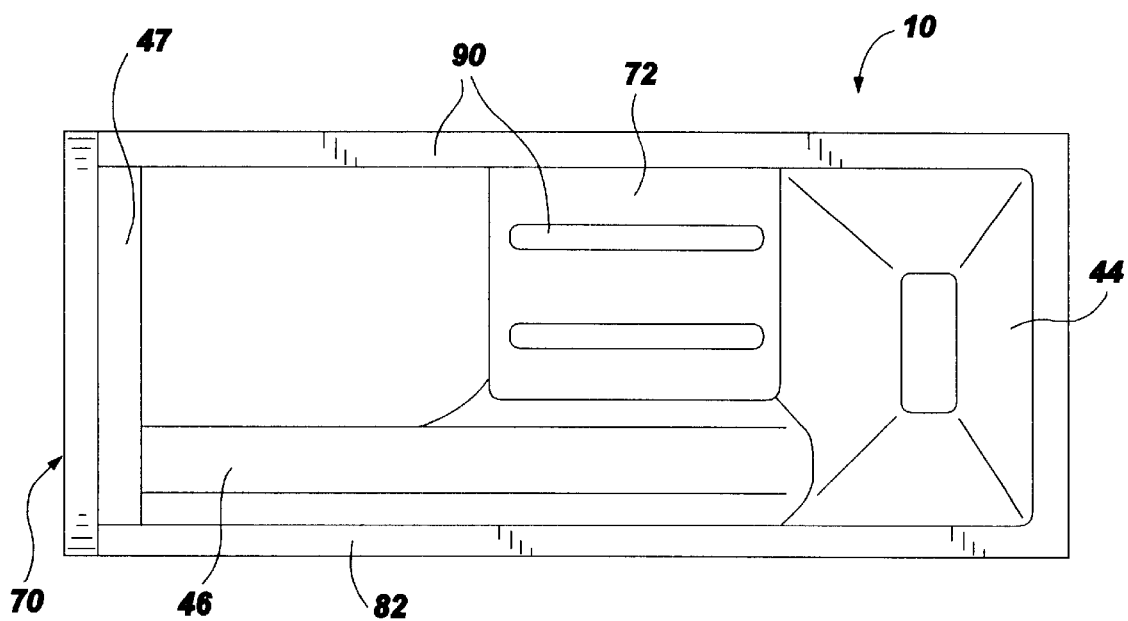
FIG. 6 is a bottom view of a preferred embodiment of the snowmobile seat of the present invention.

The cover also advantageously can be removably disposed around the base and seat sections. Thus, it can be removed for washing or repair. The cover may be comprised of various pieces or sections coupled together in order to cover the desired portion of the seat. For example, the cover 70 may have a lower seat cover 72, as shown in FIG. 6, and an upper seat cover 74, as shown in FIG. 3. The lower seat cover 72 covers any desired portion of the lower surface of the base member 40 while the upper seat cover 74 covers the seat section 60 and desired portions of the base section.

Referring to FIG. 3, the upper seat cover 74 has a flap 76 removably and selectively disposed over the access opening 48 to the utility or storage cavity 44. The flap 76 may have one edge sewn to or integrally formed with the cover 70 about which the flap pivots in order to open and close. The flap 76 can have zippers 77 formed on opposite sides, or opposite upper and lower sides, and can have a hook-and-loop type fastener or a snap type faster formed on a side opposite the edge secured to the cover. The opposite zippers 77 allow the flap 76 to be secured over the opening, while allowing the flap to be pivoted clear of the opening to provide easier access. The seat 10 may also have a reflector 78 that can be secured or sewn into the cover 70.

The cover 70 can also have a sleeve 80 formed therein for overlapping, or otherwise mating with, a portion of the snowmobile, as shown in FIGS. 1–3. The sleeve 80 prevents moisture or dirt from getting in between the seat 10 and the snowmobile, or between the cover 70 and the fuel tank 18, and into snowmobile parts.

The seat 10 can be attached to the snowmobile by hook-and-loop type fasteners, shown at 90 in FIG. 6, and snap type fasteners, shown at 92 in FIG. 1. This allows the seat to be removed from the snowmobile for service. Referring to FIG. 6, the fasteners 90 can be located about the periphery of the lower surface 22 and on any part of the lower surface 42 of the base section 40 which contacts the snowmobile. Referring to FIG. 4, one portion 91, such as the hook portion, may be disposed on the lower surface 42 of the base section 40, while the other portion 93, such as the loop portion, may be disposed on the snowmobile 14. The hook-and loop type fasteners 90 and snap type fasteners 92 work synergistically to attach the seat 10 to the snowmobile 14. The hook-and-loop type fasteners 90 engage vertically and resist horizontal movement of the seat with respect to the snowmobile. The snap type fasteners 92 engage horizontally and resist vertical movement of the seat 10 with respect to the snowmobile 14. The snap type fasteners 92 maintain the connection of the hook-and-loop type fasteners 90 by resisting vertical movement, which causes the hook-and-loop type fasteners 90 to engage and disengage. Likewise, the hook-and-loop type fasteners 92 maintain the connection of the snap type fasteners 90 by resisting horizontal movement, which causes the snap type fasteners 92 to engage and disengage.

Referring again to FIG. 6, the cover 70 can have a tab 82 formed about the periphery of the upper seat cover 74 and extends under the base section 40. The tab 82 may have hook-and-loop fasteners 90 on one side to couple to the lower seat cover 72 and on the other side to attach the cover 70 and seat 10 to the snowmobile. In this manner, the weight of the rider is utilized to maintain the hook-and-loop fasteners 90. The seat 10 is shown with the cover 70 in FIG. 3 and without the cover 70 in FIG. 5. The upper and lower seat covers 72 and 74 may be coupled by any suitable means, including hook-and-loop type fasteners, snap type fasteners, zippers, etc.

The hook-and-loop type fasteners can make installing the seat on an existing snowmobile easier. For example, the loop portion of the fastener may be sewn into the cover while the hook portion of the fastener is provided with an adhesive backing. With the hook portion fastened to the loop portion, the adhesive backing on the hook portion may be exposed and the seat then positioned on the snowmobile, easily locating the hook portion of the fastener on the snowmobile.

Figure 7:
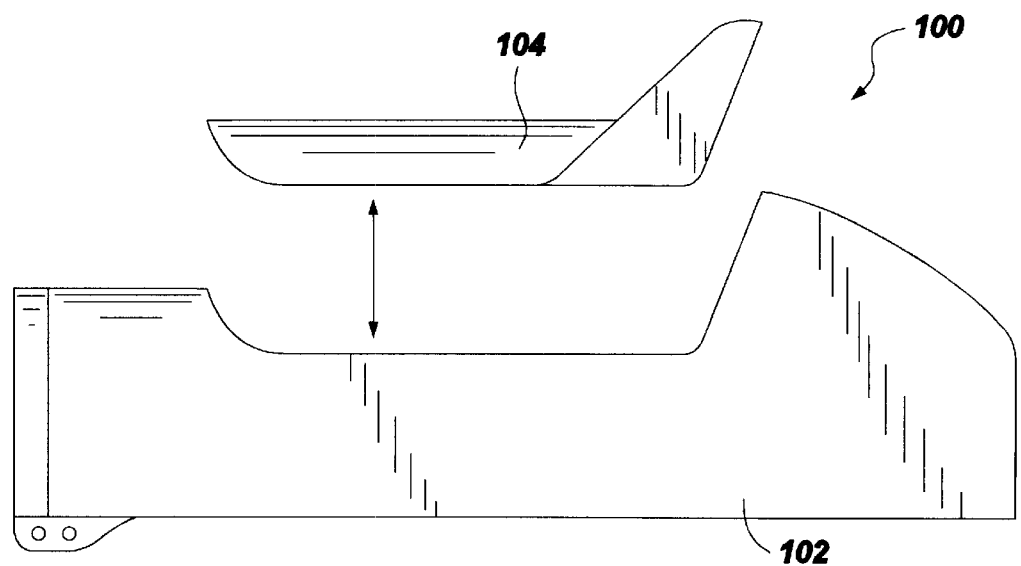
FIG. 7 is a side elevational view of an alternative embodiment of the snowmobile seat of the present invention.

As illustrated in FIG. 7, an alternative embodiment of the snowmobile seat 100 is shown. The seat 100 has a base section 102 and a seat section 104 removably disposed on the base section. The seat section 104 may be attached to the base section 102 with hook-and-loop type fasteners. Seat sections of various densities of open-cell foam may be provided such that the seats have varying degrees of flexibility. Thus, riders of various weight may select a seat section 104 of appropriate flexibility to suit their comfort.

Figure 8:
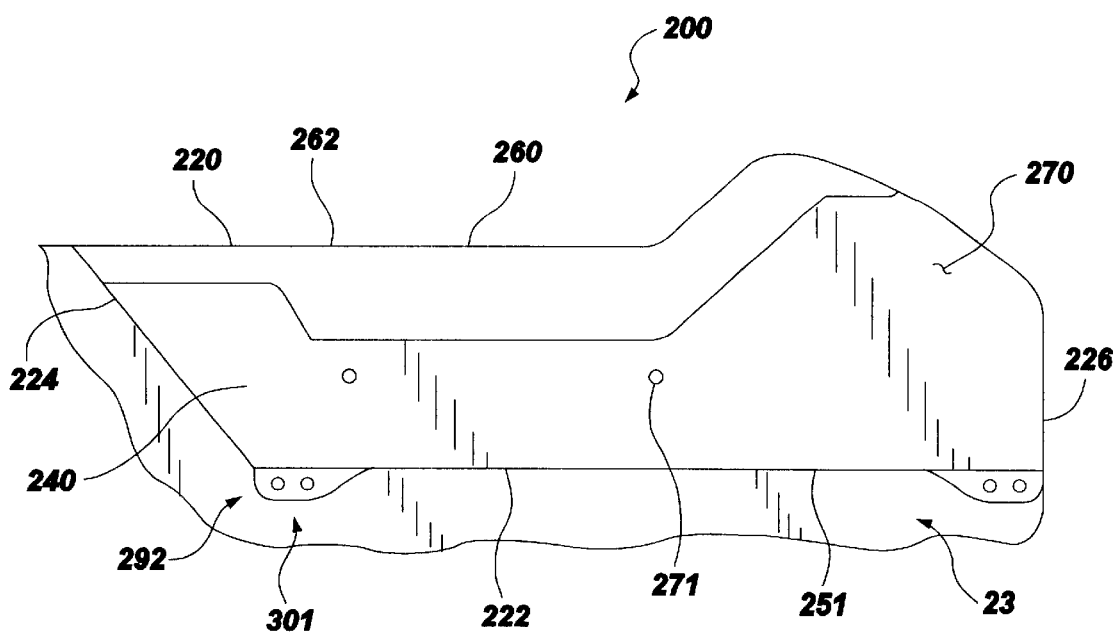
FIG. 8 is a side elevational view of an alternative embodiment of the snowmobile seat of the present invention.

As illustrated in FIG. 8, an alternative embodiment of the snowmobile seat, indicated generally at 200, is shown disposed on the snowmobile 14. Referring to FIGS. 8–10, the snowmobile seat 200 has an upper surface 220 for the rider to sit on, and a bottom 222 disposed on the snowmobile 14. The seat 200 has a front side 224, a back side 226, a left side 228 (or first lateral side) and a right side 230 (or a second lateral side).

As illustrated in FIG. 10, the snowmobile seat 200 has a base section 240, which is substantially rigid and provides support for the seat 200. The base section 240 advantageously has a closed-cell structure with cell walls and cell voids that is substantially light weight. The cell walls provide strength and rigidity while the cell voids reduce weight. The base section 240 is preferably made of a closed-cell foam.

The base section 240 has a lower surface 242 that forms at least part of the bottom 222. The lower surface 242 of the base section 240 is disposed on an upper surface 251 of the snowmobile 14. The base section 240 also has an upper surface 252. The upper surface 252 of the base section 240 advantageously has a cavity 254 formed therein.

The snowmobile seat 200 also has a seat section 260 with a lower surface 261 disposed on the base section 240, or the upper surface 252 of the base section. The seat section 260 also has an upper surface 262 on which a rider may sit. The seat section 260 is flexible and provides a cushioned seat for the rider. In addition, the seat section 260 is formed of a material which compresses and deflects under force, as discussed more fully below. The seat section 260 is preferably open-cell foam. The lower surface 261 of the seat section 260 advantageously has a cavity formed therein 263.

A space 265 advantageously is disposed between the lower surface 242 of the base section 240 and the upper surface 262 of the seat section 260 defining an air chamber. Preferably, the space 265 is formed between the base section 240 and the seat section 260, as shown. The space or air chamber 265 provides additional cushioning for the rider. In addition, the air chamber 265 provides improved shock absorbing capabilities. As the rider is forced into the seat, such as by falling into the seat or by hitting a bump with the snowmobile, the seat cushion 260 not only compresses, but displaces and/or deflects into the space 265. The space 265 may be formed by the cavity 254 in the base section 240 and/or the cavity 263 in the seat section 260.

Figure 9A:
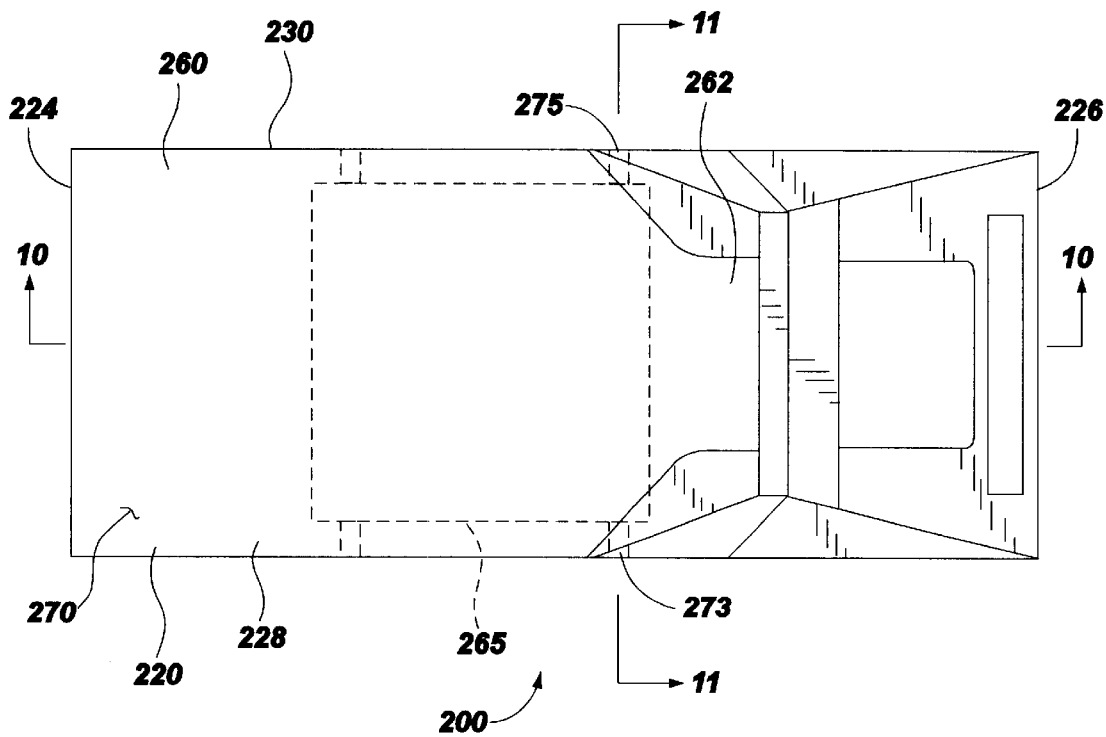
FIG. 9a is a top view of an alternative embodiment of the snowmobile seat of the present invention.
Figure 10:
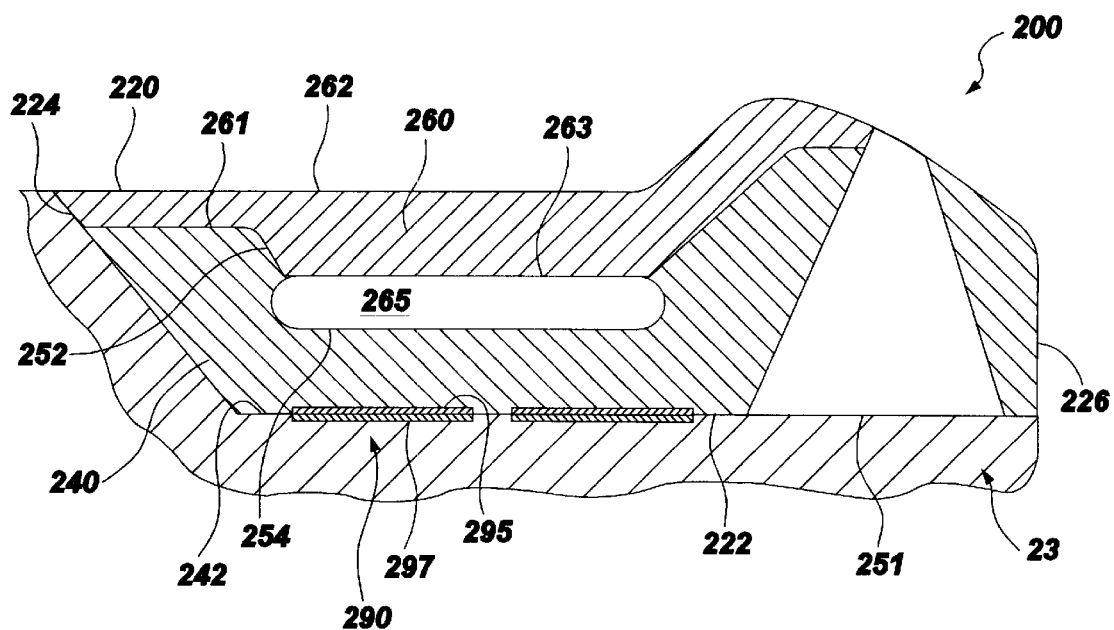

Referring to FIGS. 8 and 9a, the base and seat sections 240 and 260 have an exterior surface which preferably is covered by a cover 270. Thus, the cover 270 preferably extends over most of the base section 240 and seat section 260. In addition, the cover 270 may entirely cover and enclose the base and seat sections 240 and 260. Referring to FIG. 8, the cover 270 has one or more air holes 271 formed in the cover 270 for allowing air to pass into and out of the cover, as discussed more fully below.

Figure 11:
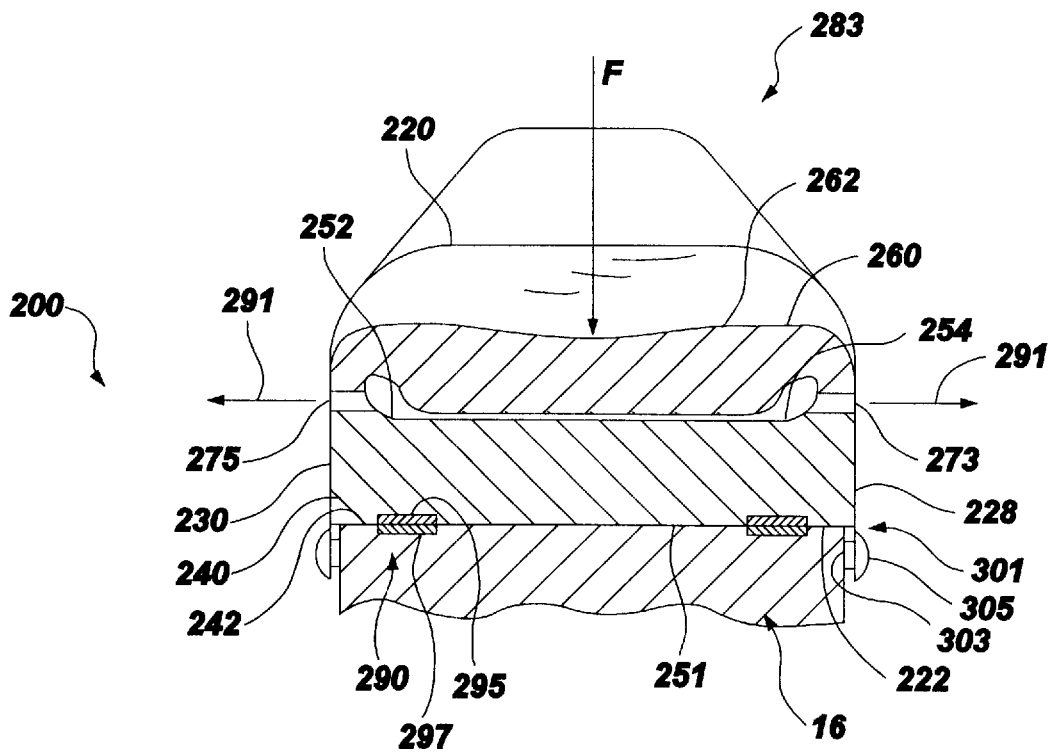
Figure 12:
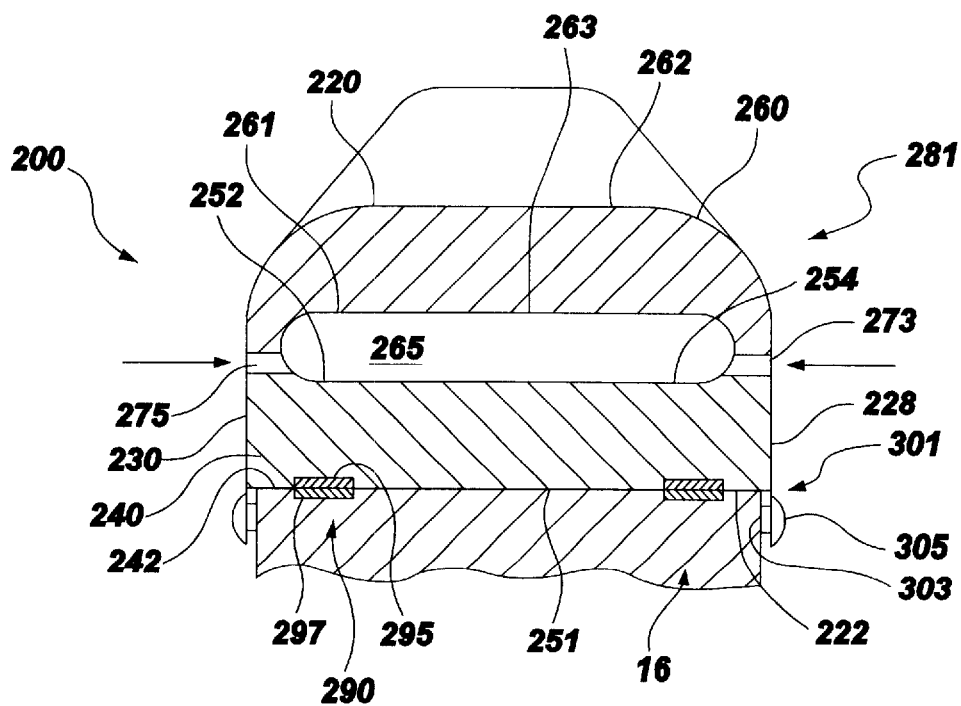

Referring to FIGS. 9a, 11 and 12, one or more air passages 273 and 275 advantageously extend from the air chamber 265 to the exterior of the seat 200. The air passages 273 and 275 preferably extend from the air chamber 265 to the lateral sides 228 and 230 of the seat 200, and to the air holes 271 (FIG. 8) in the cover 270. Preferably, the air holes 271 (FIG. 8) are formed, and the air passages 273 and 275 terminate, at the sides 228 and 230 of the seat 200 because holes located in other areas are more likely to become clogged or blocked. For example, holes at the back 226 of the seat 200 are likely to become clogged with snow kicked up by the snowmobile. In addition, holes at the top of the seat may be covered by a rider. Furthermore, air passages 273 and 275 extending to the sides 228 and 230 will most likely represent the shortest path from the air chamber 265 to the outside, or be shorter than air passages to other sides of the seat.

Referring again to FIGS. 11 and 12, the flexible seat section 260 deflects and/or displaces between a first position 281, as shown in FIG. 12, and a second position 283, as shown in FIG. 11. Referring to FIG. 12, in the first position 281, the seat section 260 is substantially undeflected, and defines the air chamber 265. The seat section 260 is in an unstressed, unloaded, position. Although the seat section 260 is flexible and compressible, it has enough rigidity to hold its form and remain suspended over the air chamber 265.

Referring to FIG. 11, in the second position 283, the seat section 260 deflects and/or displaces into the air chamber 265 under a force, indicated by the arrow F, such as the rider's weight. As the seat section 260 deflects into the air chamber 265, air in the chamber 265 is forced out of the chamber 265, through the air passages 273 and 275, and out the air openings 271 (FIG. 8) in the cover 270, as indicated by arrows 291. As indicated above, the air chamber 265 provides additional cushioning and shock absorption for the rider. Not only does the seat section 260 compress under the rider's weight, but the seat section 260 deflects into the air chamber 265.

Referring again to FIG. 12, as the seat section 260 returns to the first position 281, a vacuum is created in the air chamber 265 drawing air from the outside in through the air holes 271 (FIG. 8) in the cover 270, through the air passages 273 and 275, and into the air chamber 265. Even though the seat 200, or base and seat sections 240 and 260, is covered by the cover 270 which is preferably waterproof or water resistant, water or moisture will eventually seep through the cover 270, or seams in the cover, and into the base and seat sections 240 and 260. One disadvantage with prior art seats is that their covers tend to retain moisture in the seat. The moisture tends to rot and deteriorate the seat, and is uncomfortable for the rider.

The seat 200 of the present invention advantageously takes advantage of the cyclical up and down motion of the rider. For example, as the snowmobile 14 travels over bumps, the rider is displaced up and down with respect to the snowmobile and the seat. In addition, many snowmobiles are used in situations in which the rider repeatedly sits and stands while riding. As the rider moves up and down, or stands and sits, the seat section 260 is repeatedly deflected between the first and second position 281 and 283. As the seat section 260 deflects, air is repeatedly drawn into the air chamber 265 and expelled from the air chamber 265, thus circulating air through the seat 200. The circulating air helps keep the seat 200 dry.

One disadvantage with some prior art seats is that they have covers which trap air within the cover, and thus the seat. As a rider sits on, or is forced against, the prior art seat, air in the seat is prevented from escaping, thus reducing the cushioning effect, or shock absorption, of the seat. The air holes 271 (FIG. 8) of the seat 200 of the present invention allow air to exit the cover 270, and the seat 200. In addition, the air holes 271 (FIG. 8) provide a restriction which limits the rate of escaping air. Thus, the size of the air holes 271 (FIG. 8) may be controlled or adjusted as desired to control and adjust the cushion effect and shock absorbing characteristics of the seat 200. For example, larger air openings will allow the air to escape faster, while smaller air openings will allow the air to escape slower.

Referring to FIG. 9a, the space 265 may be a single continuous space or chamber. Alternatively, the space may be a plurality of spaces, such as left and right side chambers located near the sides of the seat. Thus, the seat has a center support between the left and right side chambers, and between the seat section and the base section.

Referring to FIGS. 8 and 10–12, the seat 200 is preferably attached to the snowmobile 14 by hook-and-loop type fasteners, indicated generally at 290, and by snap type fasteners, indicated generally at 292. The hook-and-loop type fasteners 290 and snap type fasteners 292 work synergistically to attach the seat 200 to the snowmobile 14. The hook-and-loop type fasteners 290 engage vertically and resist horizontal movement of the seat with respect to the snowmobile. The snap type fasteners. 292 engage horizontally and resist vertical movement of the seat 200 with respect to the snowmobile 14. The snap type fasteners 292 maintain the connection of the hook-and-loop type fasteners 290 by resisting vertical movement, which causes the hook-and-loop type fasteners 290 to engage and disengage. Likewise, the hook-and-loop type fasteners 292 maintain the connection of the snap type fasteners 290 by resisting horizontal movement, which causes the snap type fasteners 292 to engage and disengage. The hook-and-loop type fasteners 290 are coupled to and between the lower surface 242 of the base section 240 and the upper surface 251 of the snowmobile 14. The hook-and-loop type fasteners 290 may be coupled to a portion of the cover 270 disposed over the lower surface 242 of the base section 240. For example, the hook portion 295 of the hook-and-loop type fasteners 290 may be coupled to the lower surface 242 of the base section 240, or to a portion of the cover 270 disposed over the lower surface 242. The loop portion 297 is coupled to the snowmobile 14. The hook-and-loop type fasteners 290 are engaged, and disengaged vertically. For example, the seat 200 may be coupled to the snowmobile 14 by placing the seat 200 vertically down upon the snowmobile 14, thus engaging the hook-and-loop type fasteners 290. The seat 200 also may be removed from the snowmobile 14 by pulling the seat 200 vertically from the snowmobile 14. Thus, the hook-and-loop type fasteners 290 are disposed in a generally horizontal layer.

The snap type fasteners 292 preferably are coupled to and between the cover 270 and the snowmobile 14. The cover 270 may include tabs, indicated generally at 301. The tab 301 extends generally vertically away from the base section 240 and over the snowmobile 14. A male portion 303 of the snap type fasteners 292 may be coupled to the snowmobile 14. A female portion 305 of the snap type fasteners 292 may be coupled to the tab 301 of the cover 270. The snap type fasteners 270 are engaged, and disengaged, horizontally. For example, once the seat 200 is disposed on the snowmobile 14 and the hook-and-loop type fasteners 290 engaged, the snap type fasteners 292 may be engaged by horizontally pressing the female portion 305 against the male portion 303. Thus, the snap type fasteners 292 are disposed in a generally vertical layer.

Preferably, snap type fasteners 292 are located on a plurality of tabs 301 formed at the corners formed between adjacent sides of the base section 240. Thus, each corner of the seat 200 is secured.

Figure 13:
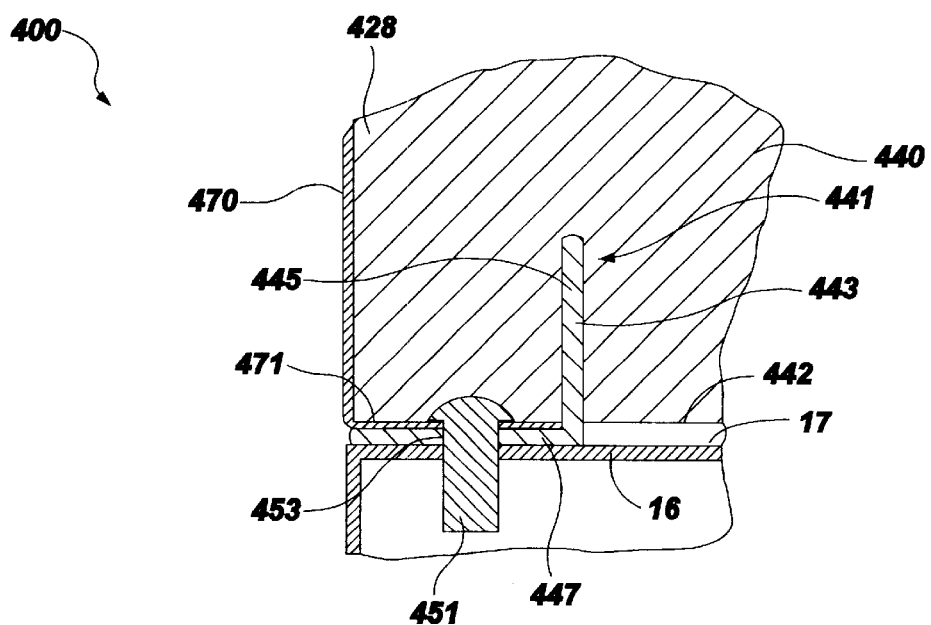
FIG. 13 is a cross sectional detail view of an alternative embodiment of the snowmobile seat of the present invention.

Referring to FIG. 13, a portion of an alternative embodiment of a seat, indicated generally at 400, is shown, namely a cross section of the left side 428 of a lower portion of the base section 440, which is also illustrative of the right side. The base section 440 has a first elongated groove 441 formed in the lower surface 442 spaced from the first, or left, lateral side 428. The base section also has a second elongated groove (not shown) identical to the first groove, but formed on the right side. The first and second elongated grooves preferably extend substantially the length of the seat 400. The seat 400 has a first elongated rail 443 coupled to the base section 440, and a second elongated rail (not shown) identical to the first. The rails preferably extend substantially the length of the seat 400. The rail 443 has a vertical portion 445 extending into the first elongated groove 441. The rail 443 also has a horizontal portion 447 extending transversely from the vertical portion 445. A portion 471 of the cover 470 is disposed on the lower surface 442 of the base section 440 and is secured between the lower surface 442 of the base section 440 and the horizontal portion 447 of the rail 443. A bolt 451 extends through an aperture 453 formed in the horizontal portion 445 of the rail 443 for fastening the rails, and thus the seat 400, to the snowmobile 14. Thus, the seat 400 may be attached with traditional bolts 451.

It is of course understood that other types of fasteners may be used. For example, rivets, screws, bolts, tab-and-eyelet, etc. may be used instead of the snap-type fasteners.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A lightweight snowmobile seat, comprising:
   a) a substantially rigid base, configured to be disposed over a track tunnel of a snowmobile, formed of a closed cell foam with cell walls and cell voids such that the base section is substantially rigid and light weight;
   b) a flexible seat section, disposed over at least a portion of the rigid base, formed of an open cell foam and having an upper surface;
   c) a storage cavity, formed at least partially in the rigid base section, configured to receive items for storage, with an opening into the storage cavity;
   d) a cover, covering at least the flexible seat section, including a water resistant material configured to resist absorption of water by the open cell foam of the flexible seat section;
   e) a flap, coupled to the cover and removably positioned over the opening into the storage cavity, having opposite sides releasably secured to the cover to selectively maintain the flap over the opening into the storage cavity; and
   f) zippers, formed between the opposite sides of the flap and the cover.

2. A light-weight snowmobile seat in accordance with claim 1, wherein the substantially rigid base section has a bottom surface configured to abut to an upper surface of the track tunnel of the snowmobile.

3. A light-weight snowmobile seat in accordance with claim 1, further comprising:
   an indentation formed in a bottom of the rigid base section configured to create a space between the rigid base section and the track tunnel of the snowmobile.

4. A light-weight snowmobile seat in accordance with claim 1, wherein the rigid base section has a forward end shaped to match a fuel tank of the snowmobile, the closed cell foam configured to provide a leak barrier between the fuel tank of the snowmobile and the flexible seat section an the cover.

5. A snowmobile seat, comprising:
   a) a flexible seat section having an upper surface configured to receive a rider thereon;

b) a cover, covering at least the upper surface of the flexible seat section; and c) a storage section, disposed adjacent the flexible seat section, having a storage cavity formed therein configured to receive items for storage, and including a closed cell foam with cell walls and cell voids formed around at least a portion of the storage cavity to thermally insulate the storage cavity.

6. A snowmobile seat in accordance with claim 5, further comprising:

a) a flap, coupled to the cover and removably positioned over an opening into the storage cavity, having opposite sides releasably secured to the cover to selectively maintain the flap over an opening into the storage cavity; and f) zippers, formed between the opposite sides of the flap and the cover.

7. A snowmobile seat in accordance with claim 5, further comprising:

a substantially rigid base, configured to be disposed between a track tunnel of the snowmobile and the flexible seat section, formed of a closed cell foam with cell walls and cell voids such that the base section is substantially rigid and light weight.

8. A snowmobile seat in accordance with claim 7, wherein the substantially rigid base section has a bottom surface configured to abut to an upper surface of the track tunnel of the snowmobile.

9. A snowmobile seat in accordance with claim 7, further comprising:

an indentation formed in a bottom of the rigid base section configured to create a space between the rigid base section and the track tunnel of the snowmobile.

10. A snowmobile seat in accordance with claim 7, wherein the rigid base section has a forward end with an indentation to match a fuel tank of the snowmobile, the closed cell foam configured to provide a leak barrier between the fuel tank of the snowmobile and the flexible seat section an the cover.

11. A snowmobile seat in accordance with claim 7, wherein the closed cell foam of the rigid base section provides a desired shape and structure of the seat.

12. A light-weight snowmobile seat, comprising:

a) a substantially rigid base, configured to be disposed over an upper surface of a track tunnel of a snowmobile, formed of a closed cell foam with cell walls and cell voids such that the base section is substantially rigid and light weight;

b) a flexible seat section, disposed over at least a portion of the rigid base, formed of an open cell foam and having an upper surface; and c) a cover, covering at least the flexible seat section, including a water resistant material configured to resist absorption of water by the open cell foam of the flexible seat section.

13. A light-weight snowmobile seat in accordance with claim 12, wherein the substantially rigid base section has a bottom surface configured to abut to the upper surface of the track tunnel of the snowmobile.

14. A light-weight snowmobile seat in accordance with claim 12, further comprising:

an indentation formed in a bottom of the rigid base section configured to create a space between the rigid base section and the upper surface of the track tunnel of the snowmobile.

15. A light-weight snowmobile seat in accordance with claim 12, wherein the rigid base section has a forward end with an indentation to match a fuel tank of the snowmobile, the closed cell foam configured to provide a leak barrier between the fuel tank of the snowmobile and the flexible seat section an the cover.

16. A light-weight snowmobile seat in accordance with claim 12, further comprising:

a storage cavity, formed at least partially in the rigid base section, configured to receive items for storage, with an opening into the storage cavity, and including a closed cell foam with cell walls and cell voids formed around at least a portion of the storage cavity to thermally insulate the storage cavity.

17. A light-weight snowmobile seat in accordance with claim 16, further comprising:

a) a flap, coupled to the cover and removably positioned over the opening into the storage cavity, having opposite sides releasably secured to the cover to selectively maintain the flap over the opening into the storage cavity; and b) zippers, formed between the opposite sides of the flap and the cover.

18. A light-weight snowmobile seat in accordance with claim 12, wherein the closed cell foam of the rigid base section provides a desired shape and structure of the seat.

* * * * *